(12) United States Patent
Atkinson et al.

(10) Patent No.: US 8,494,788 B2
(45) Date of Patent: Jul. 23, 2013

(54) GAS PRESSURE DETERMINATION IN A GAS/LIQUID FLOW

(75) Inventors: Ian Atkinson, Ely (GB); Cheng-gang Xie, Sawston (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 634 days.

(21) Appl. No.: 12/472,767

(22) Filed: May 27, 2009

(65) Prior Publication Data
US 2010/0305881 A1 Dec. 2, 2010

(51) Int. Cl.
*G01F 1/34* (2006.01)
*G01L 11/00* (2006.01)
*G01N 7/00* (2006.01)

(52) U.S. Cl.
USPC .................. 702/47; 702/50; 73/31.04

(58) Field of Classification Search
USPC ...................... 702/47, 50; 73/31.04
See application file for complete search history.

(56) References Cited

U.S. PATENT DOCUMENTS

| | | | | |
|---|---|---|---|---|
| 5,203,211 A | * | 4/1993 | Jung | 73/861.04 |
| 5,526,684 A | * | 6/1996 | Liu et al. | 73/200 |
| 6,378,380 B1 | | 4/2002 | Kusters et al. | |
| 2007/0095136 A1 | * | 5/2007 | Hewitt et al. | 73/200 |
| 2008/0223146 A1 | | 9/2008 | Atkinson et al. | |

FOREIGN PATENT DOCUMENTS

| | | |
|---|---|---|
| EA | 004076 B1 | 12/2003 |
| GB | 2430493 A | 3/2007 |
| GB | 2454256 A | 5/2009 |
| WO | 2007034132 A1 | 3/2007 |

OTHER PUBLICATIONS

Xie et al., "Systems and Methods for Measuring Multiphase Flow in a Hydrocarbon Transporting Pipeline", WO 2007/034132.*
Xie et al., "Systems and Methods for Measuring Multiphase Flow in a Hydrocarbon Transporting Pipeline", Mar. 29, 2007, WO 2007/034132.*
Atkinson et al., "New Generation Multiphase Flowmeters from Schlumberger and Framco Engineering AS," 17th International North Sea Flow Measurement Workshop, Oct. 1999: pp. 154-165.

* cited by examiner

*Primary Examiner* — Jonathan C Teixeira Moffat
*Assistant Examiner* — Regis Betsch (57) ABSTRACT

An apparatus and method is provided for determining the static gas pressure in a gas/liquid flow. The apparatus and method may be non-invasive relative to the flow to be analyzed. The apparatus and method may include swirling a multiphase flow so that the flow is separated into a gas core and a liquid outer layer, measuring flow parameters, including the liquid layer tangential velocity, the liquid holdup, and the static pressure of the flow at the wall of conduit, and determining the static gas pressure in the gas core from the measured flow parameters.

13 Claims, 6 Drawing Sheets

GAS PRESSURE DETERMINATION IN A GAS/LIQUID FLOW

FIELD

The present invention relates to gas pressure determination in a gas/liquid flow, and particularly in a swirling gas/liquid flow.

BACKGROUND

The determination of gas and liquid flow rates in gas-liquid fluid mixtures is important in the oil and gas industry.

An example of an apparatus for measuring such flow rates is Schlumberger's Vx™ system (see e.g. I. Atkinson, M. Berard, B.-V. Hanssen, G. Ségéral, 17$^{th}$ International North Sea Flow Measurement Workshop, Oslo, Norway 25-28 Oct. 1999 "New Generation Multiphase Flow meters from Schlumberger and Framo Engineering AS") which comprises a vertically mounted Venturi flow meter, a dual energy gamma-ray holdup measuring device and associated processors. This system allows the simultaneous calculation of gas, water and oil volumetric flow rates in multi-phase flows.

In the Vx™ system, and in other conventional multiphase flow meters, it is important to know the gas density at line conditions. Thus, generally it is necessary to determine the gas pressure at line conditions. For non-swirling gas-liquid flows as in the Vx™ system, the pressures at the pipe wall and pipe centre over the same pipe cross-section are substantially the same, so the pressure measured at the pipe wall at the Venturi throat section will be substantially the gas pressure thereat.

A multiphase flow meter concept is disclosed in GB A 2447490. The concept is based on swirling the flow by centrifugal force to generate a liquid annulus and a gas core. Sensors, such as ultrasonic clamp-on transducers, are used to measure the liquid-layer properties, such as the liquid-layer thickness and the axial velocity, at a Venturi throat section. These can give a direct measurement of the liquid flow rate as a result of a controlled, annular-type flow distribution over a wide range of flow conditions. For swirling gas-liquid flows, however, the pressures at the pipe wall and pipe centre over the same pipe cross-section are markedly different, so the pressure measured at the pipe wall will not be the gas-core pressure that is needed for the gas-density calculation.

SUMMARY

Embodiments of the present invention are at least partly based on the recognition that a correlation exists between the static gas pressure, $P_c$, in the gas core of a swirling multiphase flow, such as a two phase gas/liquid flow, and other parameters of the flow. More particularly:

$$P_c = F(P_w, \alpha_{liq}, v_{tan}, \rho_{liq}, \rho_{gas})$$

where $P_w$ is the static pressure of the flow at the wall of conduit, $\alpha_{liq}$ is the liquid layer holdup, $v_{tan}$ is the liquid layer tangential velocity, $\rho_{liq}$ is the liquid density, and $\rho_{gas}$ is the gas density.

Thus, in general terms, the invention provides the use, in relation to a conduit through which is conveyed a swirling gas/liquid flow separated into a gas core and a liquid outer layer, of flow parameters measured in the conduit for determining the static gas pressure in the gas core, the flow parameters including the liquid layer tangential velocity, the liquid holdup, and the static pressure of the flow at the wall of conduit.

For example, a first aspect of the invention provides a method for determining the static gas pressure in a gas/liquid flow, the method including:

providing a conduit through which is conveyed a swirling gas/liquid flow separated into a gas core and a liquid outer layer, measuring flow parameters in the conduit, the measured flow parameters including the liquid layer tangential velocity, the liquid holdup, and the static pressure of the flow at the wall of conduit, and determining the static gas pressure in the gas core from the measured flow parameters.

Optional features of the use and method are next described, the optional features being applicable, individually or in any combination, to the use and method.

Generally, $\rho_{liq}$ is known if the water and oil densities and the relative fractions of the two liquids, such as the water-in-liquid-ratio (WLR), are given or measured. Moreover, the temperature of the flow, T, is also often known e.g. by measurement, whereby $\rho_{gas}$ can be expressed in terms of $P_c$ by applying a gas law. Thus typically $P_c$ can be correlated to just $P_w$, $\alpha_{liq}$ and $v_{tan}$. However, if necessary, the measured flow parameters can also include the temperature of the flow and/or WLR whereby $P_c$ can be correlated to $P_w$, $\alpha_{liq}$, $v_{tan}$, T and/or WLR.

Advantageously, the method allows the static gas pressure in the gas core to be determined without an intrusive, and potentially unreliable, probe being inserted into the flow to measure that pressure.

Rather than directly measuring the liquid layer tangential velocity, the liquid holdup, and the wall static pressure, any one or combination of these flow parameters can be measured indirectly. For example, the liquid layer tangential velocity can be measured indirectly from a measurement of the liquid layer axial velocity (e.g. ultrasonically). This is discussed further in the Detailed Description below, where it is shown that the tangential velocity is typically linearly dependent on the axial velocity for a given WLR. As a further example, the liquid holdup can be measured indirectly from a measurement of the thickness of the liquid layer (e.g., ultrasonically), which in a conduit of known cross-section equates to a measurement of $\alpha_{liq}$. Alternatively or additionally, the liquid holdup can be measured indirectly from a measurement of the flow mixture density, $\rho_{mix}$ (e.g. using γ-rays or X-rays), which correlates with $\alpha_{liq}$ (i.e., from $\rho_{mix} = \rho_{liq} \alpha_{liq} + \rho_{gas}(1-\alpha_{liq})$). Alternatively or additionally, the liquid holdup can be measured indirectly from a measurement of the flow mixture complex dielectric constant, $\epsilon_{mix}$ (e.g. using radio-frequency and/or microwave transmission and/or reflection methods). Alternatively or additionally, the liquid holdup can be measured indirectly from a combined measurement of the flow mixture $\epsilon_{mix}$ and $\rho_{mix}$ (e.g., using combined RF/microwave and γ-rays methods), as disclosed in GB A 2430493.

Thus the liquid layer tangential velocity and/or the liquid holdup can be measured ultrasonically. Advantageously, such measurements can be relatively simple and reliable to perform and can utilise robust equipment. Preferably, the liquid layer tangential velocity and the liquid holdup are measured indirectly from ultrasound measurements of the liquid layer axial velocity and the liquid layer thickness respectively. This allows one ultrasound probe to take both measurements. However, other options for measuring either of these parameters include γ-rays, X-rays or RF/microwave (as mentioned above) for indirectly measuring the liquid holdup. Liquid layer tangential velocity may be measured by using ultrasonic or RF/microwave Doppler methods. Alternatively or additionally, liquid layer tangential velocity may be measured based on cross-correlation of the signals from a plurality of ultrasonic, or electrical, or RF/microwave, or optical sensors with appropriate spatial spacing(s).

Preferably, the conduit contains a constriction having a reduced conduit cross-section, the flow parameters being measured at the constriction. Advantageously, such a constriction can enhance the swirl of the flow and lead to improved liquid/gas separation. For example, the constriction can be provided by a Venturi.

The liquid may have two liquid phases (e.g. oil and water). In such a case, the measured flow parameters may include the relative fractions of the two liquids, such as the water-in-liquid-ratio (WLR). The relative fractions may be measured, on-line or from a representative liquid-layer sample, based on nuclear, or ultrasonic, or electrical, or RF/microwave, or millimeter wave, or optical, or Coriolis, or pressure sensors. The measured relative fractions allow the density of the liquid to be determined (whether assuming no slip between the two phases, or applying a slip law).

A second aspect of the invention provides the use of the method of the first aspect (optionally including any one or any combination of optional features of that method) for measuring flow rates in the gas/liquid flow. The total flow rate may be determined from the measured differential pressure across the constriction, such as the inlet and throat of a Venturi, together with the measured liquid-holdup (as mentioned above) and the gas and liquid densities. The gas flow rate may then be determined by the difference of the total flow rate and the measured liquid flow rate.

A third aspect of the invention provides an apparatus for determining the static gas pressure in a gas/liquid flow, the apparatus including:

a conduit for conveying a swirling gas/liquid flow separated into a gas core and a liquid outer layer, an arrangement for measuring flow parameters in the conduit, the measured flow parameters including the liquid layer tangential velocity, the liquid holdup, and the static pressure of the flow at the wall of conduit, and a computer system configured to determine the static gas pressure in the gas core from the measured flow parameters.

Thus the apparatus corresponds to the method of the first aspect. Optional features of the apparatus are next described, the optional features being applicable to the apparatus individually or in any combination. Any one or any combination of optional features of the method of the first aspect may also provide corresponding optional feature(s) of the apparatus.

The apparatus may further include a swirl element for inducing the gas/liquid flow to swirl. For example, the swirl element can have a tangential slot inlet to the conduit. An alternative inline swirl element is e.g. a helical insert in the conduit or a motor-driven impeller.

The conduit may contain a constriction having a reduced conduit cross-section, the flow parameters being measured at the constriction. Preferably, the constriction is provided by a Venturi.

Preferably, the arrangement for measuring flow parameters in the conduit includes one or more ultrasound probes for measuring the liquid layer tangential velocity and/or the liquid holdup ultrasonically. For example, the liquid layer tangential velocity and the liquid holdup can be measured indirectly from ultrasound measurements of the liquid layer axial velocity and the liquid layer thickness respectively. A single ultrasound probe may take both of these measurements.

The liquid may have two liquid phases. In this case, the measured flow parameters can include the relative fractions of the two liquids.

Preferably the apparatus does not have a probe (e.g. a pressure meter) physically extending into the gas core for measuring the static gas pressure in the core.

A fourth aspect of the invention provides a multiphase flow meter including the apparatus of the third aspect (and optionally including any one or combination of the optional features of the apparatus) and a computer system configured to determine the flow rate(s) of the gas, the liquid and/or the gas and liquid using the determined static gas pressure.

A fifth aspect of the invention provides an oil well pipeline or a gas well pipeline including an apparatus according to the third aspect (and optionally including any one or combination of the optional features of the apparatus), or a flow meter according to the fourth aspect (and optionally including any one or combination of the optional features of the flow meter).

A sixth aspect of the invention provides the computer system of the third aspect, a seventh aspect of the invention provides a corresponding computer program, and an eighth aspect of the invention provides a computer program product carrying the computer program of the seventh aspect. Thus, (i) the computer system of the sixth aspect can be configured to determine the static gas pressure in a gas core from flow parameters measured in a conduit which conveys a swirling gas/liquid flow separated into the gas core and a liquid outer layer, the measured flow parameters including the liquid layer tangential velocity, the liquid holdup, and the static pressure of the flow at the wall of conduit, and (ii) the computer program of the seventh aspect can determine the static gas pressure in a gas core from flow parameters measured in a conduit which conveys a swirling gas/liquid flow separated into the gas core and a liquid outer layer, the measured flow parameters including the liquid layer tangential velocity, the liquid holdup, and the static pressure of the flow at the wall of conduit. Again, optional features of the preceding aspects are applicable, individually or in any combination, to the sixth, seventh and eighth aspects.

BRIEF DESCRIPTION OF THE DRAWINGS

Embodiments of the invention will now be described by way of example with reference to the accompanying drawings in which:

FIGS. 6(a) and (b) show gas-core throat pressures derived, in accordance with an embodiment of the present invention, from respectively the solid-body model and the solid-body/free-vortex model plotted against the measured corresponding gas-core pressures, and FIGS. 6(c) and (d) show the ratio between the derived and the measured values for the gas-core throat pressure for respectively the solid-body model and the solid-body/free-vortex model;

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Experiments were performed to measure the pipe-wall/gas-core radial differential pressure ($P_{wc,th}$) at the throat section of a Venturi, and to compare the measured differential pressure to that calculated from (i) a model based on solid-body rotation for both the gas-core and the liquid-layer, and (ii) a model based on solid-body rotation for the gas-core and free-vortex for the liquid-layer. The experiments showed that the gas-core pressure can be derived from the measured wall pressure, the liquid-layer holdup and the tangential liquid velocity, the last two being measurable by ultrasonic sensors.

Figure 1:
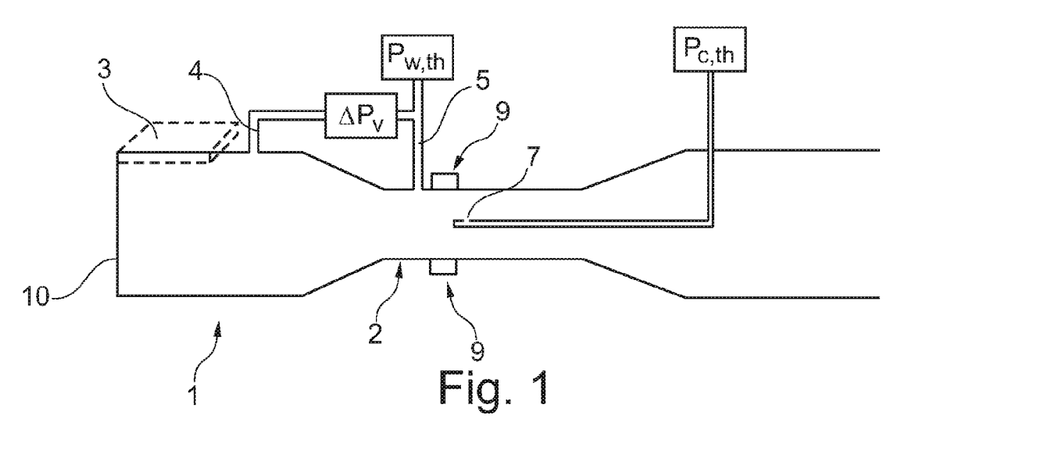
FIG. 1 shows schematically an experimental arrangement for measuring differential pressure, liquid fraction and liquid tangential velocity, in accordance with an embodiment of the present invention.

Differential Pressure, Liquid Fraction and Liquid Tangential Velocity Measurements As shown schematically in FIG. 1, the experiments utilised a swirling gas-liquid flow through a conduit pipe 1 having a Venturi 2. A tangential inlet 3 was used to generate swirl in the pipe. The differential pressure, $\Delta P_v$, was measured between an inlet wall tapping 4 and a throat wall tapping 5. Static pressures were also measured at the throat wall tapping 5 ($P_{w,th}$), and at an intrusive throat gas core probe 7 ($P_{c,th}$). Two ultrasonic pulse-echo and Doppler transducers 9 were mounted at the throat-section pipe topside and underside for measuring respectively liquid-layer thickness and axial velocity.

Experiments were performed at water/liquid ratios (WLRs) of 0.0 (oil/gas two phase flow), ~0.2, ~0.5, ~0.8 or 1.0 (water/gas two phase flow), and with the gas-volume-fraction (GVF) at the throat section up to about 95%. Nitrogen gas, kerosene oil and tap water were the experimental fluids.

Figure 2:
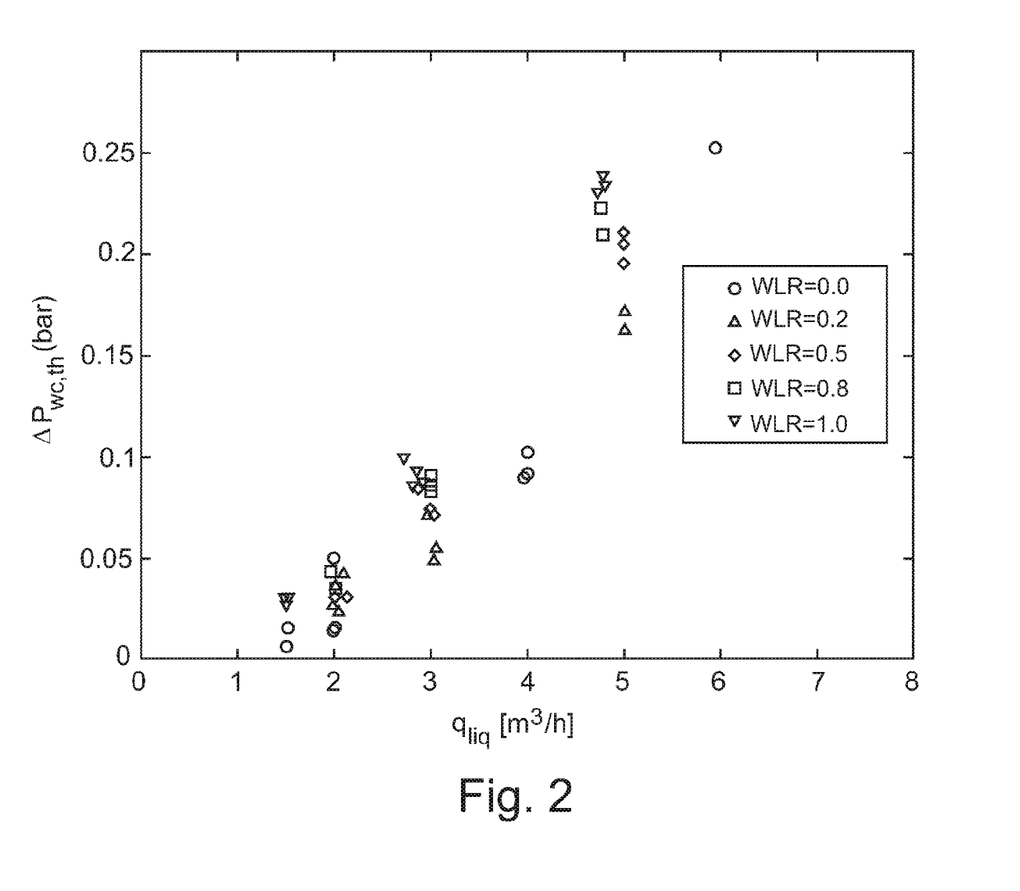
FIG. 2 shows the experimentally determined throat pipe wall/gas core differential pressures plotted against liquid volumetric flow rate for the water/liquid ratio (WLR) at 0.0 (oil/gas two phase flow), ~0.2, ~0.5, ~0.8 or 1.0 (water/gas two phase flow)

The gas core pressure at the throat of the Venturi, $P_{c,th}$, was measured by probe 7. Experimentally determined throat pipe wall/gas core differential pressures, $\Delta P_{wc,th}$, are shown in FIG. 2 plotted against liquid volumetric flow rate $q_{liq}$ for the various WLRs, and were derived from $\Delta P_{wc,th} = P_{w,th} - P_{c,th}$.

Figure 3:
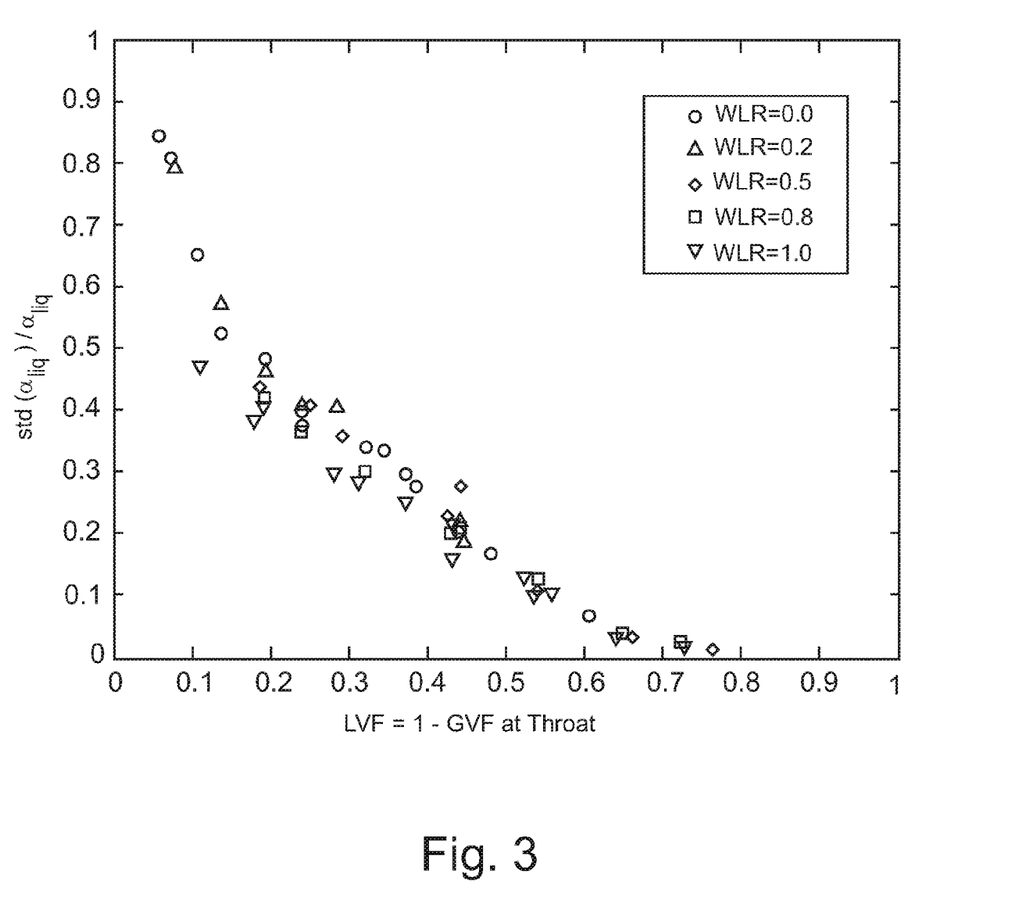
FIG. 3 shows a plot of the ratio of the standard deviation of the ultrasound derived liquid holdup to the time-averaged liquid holdup against liquid-volume-fraction.

The time-averaged liquid holdup ($\alpha_{liq}$) at the throat was derived from the ultrasound Doppler, pulse-echo mode, pipe top-bottom, liquid-layer thickness measurements. FIG. 3 plots the ratio of the standard deviation of $\alpha_{liq}$ to the time-averaged $\alpha_{liq}$ and shows that the standard deviation is comparable with the mean $\alpha_{liq}$ itself for high gas fractions (i.e. with liquid volume fraction LVF<10%).

Radial Differential Pressure at Throat

Assuming solid-body rotation for both the liquid layer and the gas core, the radial pressure gradient, $dp/dr = \rho r \omega^2$ (where $\omega$ is the angular velocity and r is radial distance), can be integrated from the pipe inner wall (r=R) to pipe core (r=0) and with a gas-liquid interface at r=$r_g$, to derive the wall-core differential pressure as:

$$\Delta P_{wc} = p(R) - p(0) = \frac{1}{2}\omega^2 [\rho_{liq}(R^2 - r_g^2) + \rho_{gas} r_g^2] \quad (1)$$

$$= \frac{1}{2}\omega^2 R^2 (\rho_{liq}\alpha_{liq} + \rho_{gas}\alpha_{gas})$$

$$= \frac{1}{2}\rho_{mix}(v_{tan}^{SB}(R))^2$$

where $v_{tan}^{SB}(R)$ is the (solid body) tangential liquid velocity at the pipe wall, the mixture density $\rho_{mix} = \rho_{liq}\alpha_{liq} + \rho_{gas}(1-\alpha_{liq})$, the liquid holdup $\alpha_{liq}$ is obtained from ultrasonic liquid-layer thickness measurement, and the oil-water non-slip liquid density $\rho_{liq} = \rho_{water} WLR + \rho_{oil}(1-WLR)$, with the $WLR = q_{water}/q_{liq}$. Thus a direct measurement of liquid-layer tangential velocity $v_{tan}^{SB}(R)$ at the throat pipe wall, e.g., by using properly aligned Doppler ultrasound sensor(s), can be used to determine the wall-core differential pressure $\Delta P_{wc}$.

However, an indirect measurement of liquid-layer tangential velocity $v_{tan}^{SB}(R)$ may be obtained from the ultrasonically measured liquid-layer axial velocity $u_{liq}$. FIGS. 4(a) to (e) show $v_{tan}^{SB}(R) = \sqrt{2\Delta P_{wc,th}/\rho_{mix}}$ plotted against liquid-layer axial velocity $u_{liq}$ (=$q_{liq}/(\alpha_{liq} A_T)$ where $A_T$ is the throat cross-sectional area), for respectively WLR=0, 0.2, 0.5, 0.8 and 1, and in each case with a linear fit of $v_{tan}^{SB}(R) = k_{SB} u_{liq}$ shown. To determine $\alpha_{liq}$ from the ultrasound measurements, sound velocities were used in oil of 1345 m/s, in water of 1450 m/s, and in water/oil mixtures of 1400 m/s. FIG. 4(f) shows a plot of the linear fit slope, $k_{SB}$, against WLR.

Figure 4:
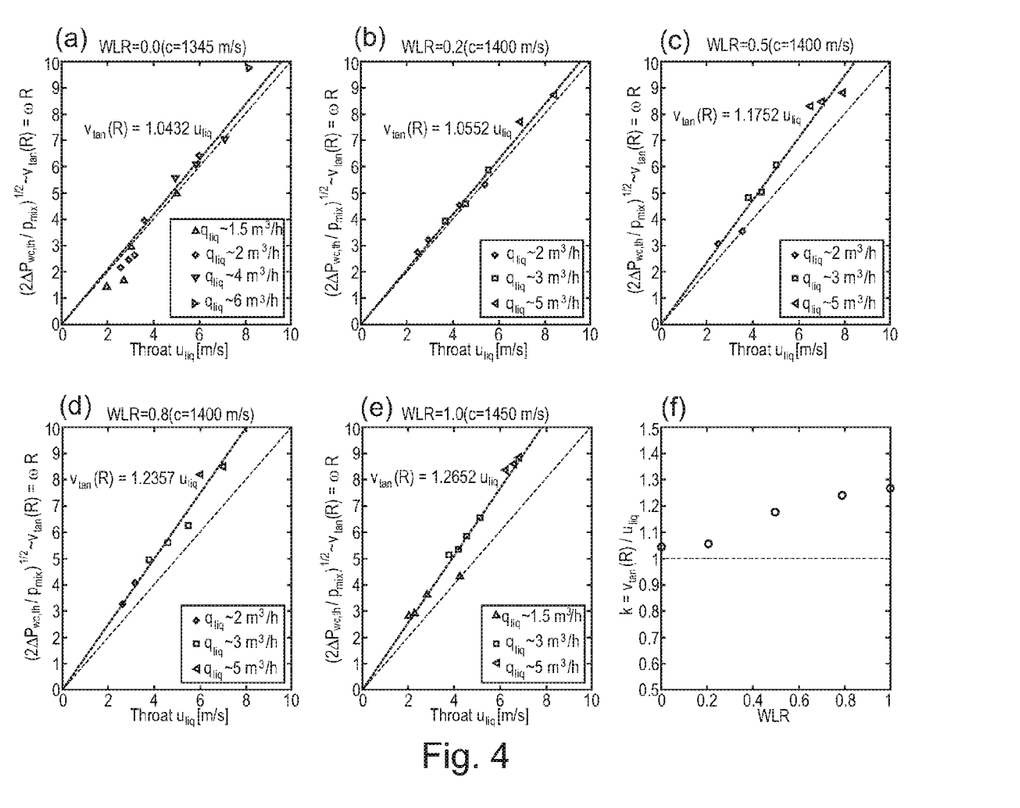
FIGS. 4(a) to (e) show tangential liquid velocities derived from the throat pipe wall/gas core differential pressures and assuming a solid-body model plotted against liquid-layer axial velocity for respectively WLRs of 0, 0.2, 0.5, 0.8 and 1.
FIG. 4(f) shows a plot of the corresponding linear fit slopes against WLR.
Figure 5:
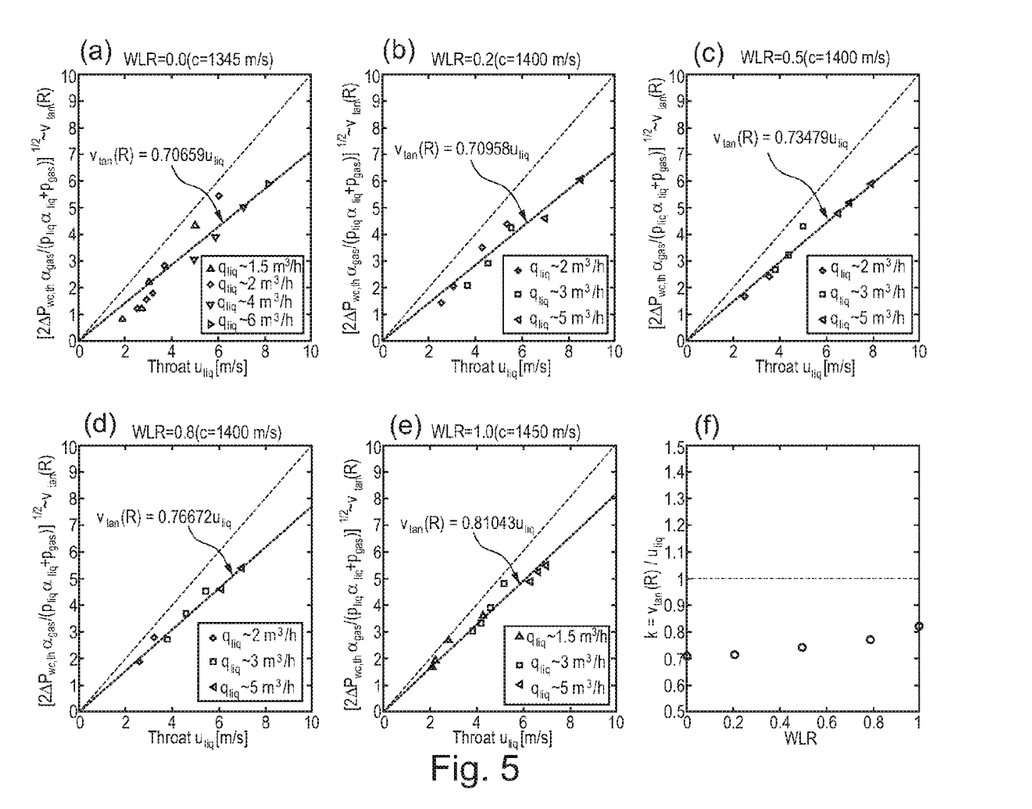
FIGS. 5(a) to (e) show tangential liquid velocities derived from the throat pipe wall/gas core differential pressures and assuming a solid-body/free-vortex model plotted against liquid-layer axial velocity for respectively WLRs of 0, 0.2, 0.5, 0.8 and 1.
FIG. 5(f) shows a plot of the corresponding linear fit slopes against WLR.

FIG. 4 shows that $v_{tan}^{SB}(R) = \sqrt{2\Delta P_{wc,th}/\rho_{mix}}$ varies linearly with the liquid axial velocity $u_{liq}$. The slope, $k_{SB}$, of the best-fit linear dependence (of $v_{tan}^{SB}(R) = k_{SB} u_{liq}$) increases with increasing WLR, indicating that the tangential velocity is greater for water-gas flows than for oil-gas flows. This is believed to be caused by changes in the liquid-mixture viscosity (and hence changes in the wall friction) with the WLR. Based on the solid-body rotation model calculation, $\sim 1 < k_{SB} < \sim 1.3$.

A similar analysis can be performed assuming a solid-body rotation for the gas-core and a free-vortex for the liquid layer, i.e. assuming the following tangential velocity profile:

$$v = \begin{cases} Ar & 0 \leq r \leq r_g \quad \text{gas} \\ \frac{A r_g^2}{r} & r_g \leq r \leq R \quad \text{liquid} \end{cases} \quad (2)$$

It can be shown that the radial pressure gradient in the gas-core and in the liquid-layer then becomes:

$$\frac{\partial p}{\partial r} = \rho \frac{v^2}{r} = \begin{cases} \rho_{gas} A^2 r & 0 \leq r \leq r_g \quad \text{gas} \\ \rho_{liq} \frac{A^2 r_g^4}{r^3} & r_g \leq r \leq R \quad \text{liquid} \end{cases} \quad (3)$$

From equation (2), the liquid-layer tangential velocity at the pipe wall r=R is:

$$v(R) = A R (r_g^2/R^2) = A R \, \alpha_{gas}$$

Integrating equation (3) provides the radial pressure gradient from the pipe wall to core:

$$\Delta P_{wc} = p(R) - p(0) = \frac{1}{2}\alpha_{gas}(AR)^2(\rho_{liq}\alpha_{liq} + \rho_{gas}) \quad (4)$$

$$= \frac{1}{2}\frac{(v_{tan}^{SBFV}(R))^2}{\alpha_{gas}}(\rho_{liq}\alpha_{liq} + \rho_{gas})$$

where $v_{tan}^{SBFV}(R)$ is the (solid body/free vortex) tangential liquid velocity at the pipe wall. It can be noted that this model has a "singularity" point for liquid-only flow when $\alpha_{gas}=0$. Again, a direct ultrasonic measurement of tangential velocity $v_{tan}^{SBFV}(R)$ at the throat can be used to determine the wall-core differential pressure $\Delta P_{wc}$. Alternatively or additionally, an indirect measurement of liquid-layer tangential velocity $v_{tan}^{SBFV}(R)$ may be obtained from the ultrasonically measured liquid-layer axial velocity $u_{liq}$.

FIGS. 5(a) to (e) show $v_{tan}^{SBFV}(R) = \sqrt{2\Delta P_{wc,th}\alpha_{gas}/(\rho_{liq}\alpha_{liq}+\rho_{gas})}$ plotted against liquid-layer axial velocity $u_{liq}$, for respectively WLR=0, 0.2, 0.5, 0.8 and 1, and in each case with a linear fit of $v_{tan}^{SBFV}(R) = k_{SBFV} u_{liq}$ shown. FIG. 5(f) shows a plot of the linear fit slope, $k_{SBFV}$, against WLR.

FIG. 5 again shows that $v_{tan}^{SBFV}(R) = \sqrt{2\Delta P_{wc,th}\alpha_{gas}/(\rho_{liq}\alpha_{liq}+\rho_{gas})}$ varies linearly with the liquid axial velocity $u_{liq}$, and $k_{SBFV}$ increases with increasing WLR. Based on the solid-body/free-vortex rotation model calculation, $\sim 0.7 < k_{SBFV} < \sim 1$.

From equations (1) and (4), at low pressures, the ratio $k_{SBFV}/k_{SB}$ (equivalent to the ratio of the tangential velocity of the solid-body rotation model to the solid-body/free-vortex model) is:

$$\frac{k_{SBFV}}{k_{SB}} = \frac{v_{tan}^{SBFV}}{v_{tan}^{SB}} = \sqrt{\frac{\alpha_{gas}\rho_{mix}}{\rho_{liq}\alpha_{liq} + \rho_{gas}}} \approx \sqrt{\alpha_{gas}} \quad (5)$$

Hence the ratio $k_{SBFV}/k_{SB}$ is strongly dependent on the gas fraction.

Deriving Gas-Core Pressure from the Measured Wall Pressure

Gas density can be related to gas pressure by:

$$\rho_{gas} = \frac{MW_{gas}}{R_{gas} P_{atm}} \frac{p_{gas}}{T[K]} = k_{gas} p_{gas} \quad (6)$$

where $MW_{gas}$ is the gas molecular weight, $R_{gas}$ is the gas constant, T is the gas temperature (in Kelvin), $P_{atm}$ is the atmospheric pressure (for $N_2$ gas, $\rho[kg/m^3]=337.1\times P[bara]/T[K]$).

The swirl-flow radial differential pressure model (e.g. equation (1) or (4)) may be used to derive the gas-core pressure from the wall pressure. This avoids the use of an intrusive gas-core pressure probe 7 installed in the throat section.

Having established a correlation of the form $v_{tan}^{SB}(R) \approx k_{SB} u_{liq}$, we can rewrite the solid-body rotation model of equation (1) as:

$$p_{wall} - p_{gas} = \frac{1}{2}(v_{tan}^{SB}(R))^2(\rho_{liq}\alpha_{liq} + k_{gas} p_{gas} \alpha_{gas}) \quad (7)$$

$$= \frac{1}{2}(k_{SB} u_{liq})^2(\rho_{liq}\alpha_{liq} + k_{gas} p_{gas} \alpha_{gas})$$

and hence:

$$p_{gas}^{SB} = \frac{p_{wall} - \frac{1}{2}\rho_{liq}\alpha_{liq}(k_{SB}u_{liq})^2}{1 + \frac{1}{2}k_{gas}\alpha_{gas}(k_{SB}u_{liq})^2} \quad (8)$$

Similarly, with a $v_{tan}^{SBFV}(R) \approx k_{SBFV} u_{liq}$ correlation, the solid-body/free-vortex model of equation (4) can be rewritten as:

$$p_{wall} - p_{gas} = \frac{1}{2}\frac{(v_{tan}^{SBFV}(R))^2}{\alpha_{gas}}(\rho_{liq}\alpha_{liq} + k_{gas}p_{gas}) \quad (9)$$

$$= \frac{1}{2}\frac{(k_{SBFV}u_{liq})^2}{\alpha_{gas}}(\rho_{liq}\alpha_{liq} + k_{gas}p_{gas})$$

and hence:

$$p_{gas}^{SBFV} = \frac{p_{wall} - \frac{1}{2}\rho_{liq}\alpha_{liq}(k_{SBFV}u_{liq})^2/\alpha_{gas}}{1 + \frac{1}{2}k_{gas}(k_{SBFV}u_{liq})^2/\alpha_{gas}} \quad (10)$$

In equation (8) or (10), the liquid/gas holdup ($\alpha_{liq}$, $\alpha_{gas}=1-\alpha_{liq}$) and the axial liquid velocity $u_{liq}$ can be measured from, for example, the ultrasonic pulse-echo and/or Doppler transducers. If a direct measurement of the liquid-layer tangential velocity $v_{tan}^{SB}(R)$ or $v_{tan}^{SBFV}(R)$ can be made, for example, by ultrasonic Doppler means, its estimate ($v_{tan}^{SB}(R) \approx k_{SB} u_{liq}$ or $v_{tan}^{SBFV}(R) \approx k_{SBFV} u_{liq}$) from the liquid-layer axial velocity ($u_{liq}$) in equation (8) or (10) can be replaced by the direct measurement.

Figure 6:
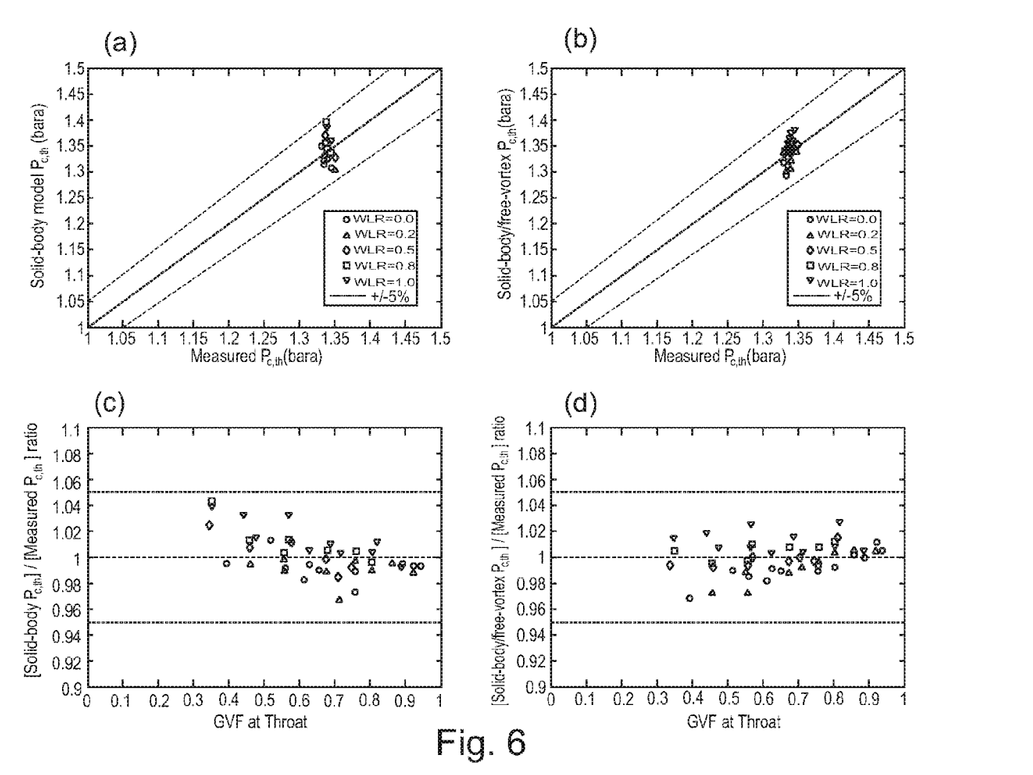

The gas-core throat pressures, $P_{c,th}$, derived from the solid-body model (equation (8)) and the solid-body/free-vortex model (equation (10)) are shown respectively in FIGS. 6(a) and 6(b) plotted against the corresponding gas-core pressures measured by probe 7. The derived gas-core pressure for FIGS. 6(a) use a value for $k_{SB}=1.16$, which is the overall linear best-fit for $v_{tan}^{SB}(R)=k_{SB}u_{liq}$ for the range of WLR data points, while the derived gas-core pressure for FIGS. 6(b) use a value for $k_{SBFV}=0.73$, which is the overall linear best-fit for $v_{tan}^{SBFV}(R)=k_{SBFV}u_{liq}$ for the range of WLR data points. FIGS. 6(c) and (d) show the ratio between the derived and the measured values for $P_{c,th}$ for respectively the solid-body model and the solid-body/free-vortex model. The uncertainty in the gas-core pressure determination is within ±5% of measurement at low line-pressures for GVFs of up to ~95%.

From equations (8) and (10), the throat gas-core pressure fractional error ($\Delta p_{gas}/p_{gas}$) can be derived as a function of the absolute error in the liquid holdup ($\Delta \alpha_{liq}$) as follows:

$$\left(\frac{\Delta p_{gas}}{p_{gas}}\right)_{SB} = \Delta\alpha_{liq}\frac{(k_{SB}u_{liq})^2}{2}\left(\frac{k_{gas}}{1 + \frac{1}{2}k_{gas}\alpha_{gas}(k_{SB}u_{liq})^2} - \frac{\rho_{liq}}{p_{wall} - \frac{1}{2}\rho_{liq}\alpha_{liq}(k_{SB}u_{liq})^2}\right) \quad (11)$$

$$\left(\frac{\Delta p_{gas}}{p_{gas}}\right)_{SBFV} = \Delta\alpha_{liq}\frac{(k_{SBFV}u_{liq})^2}{2\alpha_{gas}^2}\left(\frac{-k_{gas}}{1 + \frac{1}{2}k_{gas}(k_{SBFV}u_{liq})^2/\alpha_{gas}} - \frac{\rho_{liq}}{p_{wall} - \frac{1}{2}\rho_{liq}\alpha_{liq}(k_{SBFV}u_{liq})^2/\alpha_{gas}}\right) \quad (12)$$

Figure 7:
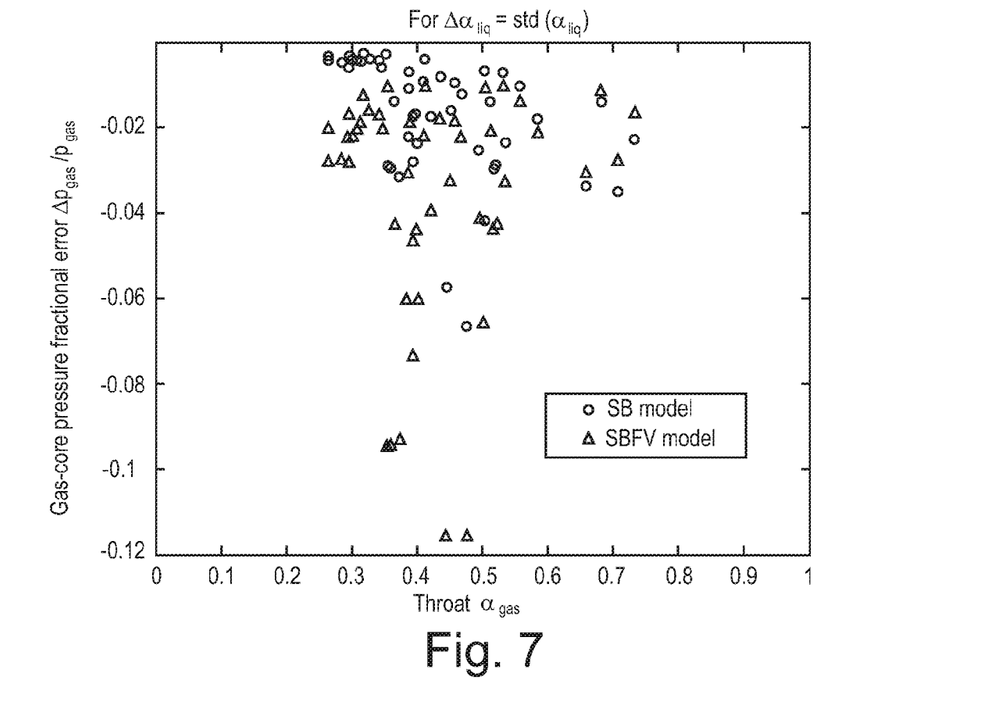
FIG. 7 shows the fractional error in the gas-core pressure for the solid-body model and the solid-body/free-vortex model plotted against the gas holdup at the throat.

FIG. 7 shows the fractional error in the gas-core pressure (at the throat) for the solid-body model (equation (11)) and the solid-body/free-vortex model (equation (12)), with the absolute error in the liquid holdup $\Delta\alpha_{liq}$ equal to the standard deviation of $\Delta_{liq}$ (as shown in FIG. 3), plotted against throat $\alpha_{gas}$. For both models, most of the $\Delta p_{gas}/p_{gas}$ data points are within 5% of reading.

Concluding Remarks

The experiments show that gas-core pressure can be determined from measurements of wall pressure, liquid-layer holdup and liquid tangential velocity.

In multiphase flowmeters, the liquid and gas flow rates are typically measured at line conditions, but it is the flow rates at standard conditions (i.e. at atmospheric pressure and 15° C.) that are required. To determine these standard flow rates the line pressure is required together with a pressure-volume-temperature (PVT) description of the fluids. Thus the gas-core pressure determined as above can be used in the measurement of standard flow rates.

More specifically, the total flow rate may be determined from the measured differential pressure across a constriction (such as the inlet and throat of the Venturi), together with the measured liquid-holdup (e.g. ultrasonically), and the gas and liquid densities (the gas density being calculated from the gas-core pressure determined as above). The liquid flow rate can be determined (directly) from ultrasound (e.g. liquid-layer holdup and axial velocity) measurements. The gas flow rate may then be determined from the difference between the total flow rate and the ultrasonically measured liquid flow rate.

Figure 8:
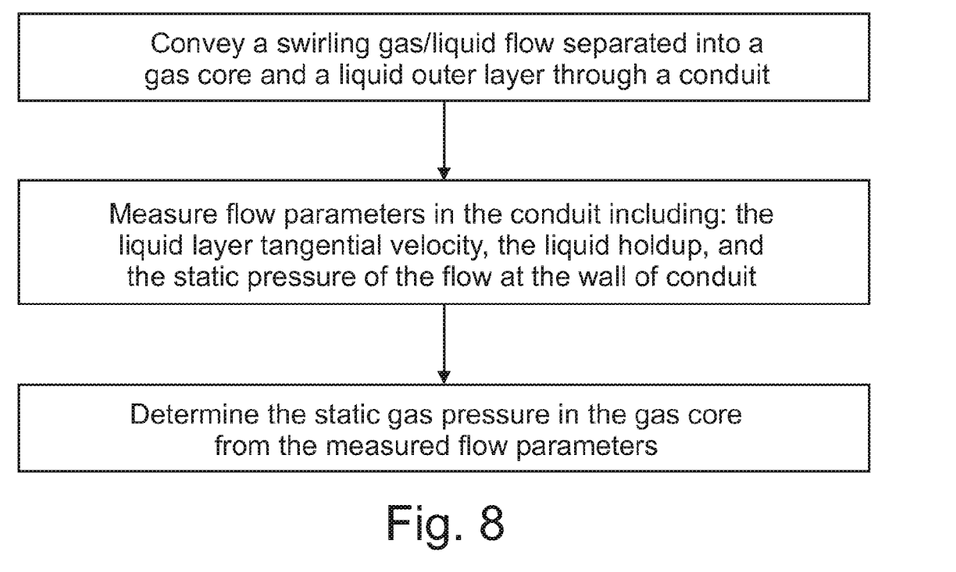
FIG. 8 shows a flow diagram illustrating a method for determining the gas core pressure in a gas/liquid flow according to an embodiment of the present invention.

FIG. 8 shows a flow diagram illustrating a method for determining the gas core pressure in a gas/liquid flow according to the present invention.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are incorporated by reference.

The invention claimed is:

1. A method for determining a static gas pressure in a gas/liquid flow, the method including:
   swirling gas/liquid flow through a conduit, wherein the gas/liquid flow is separated into a gas core and a liquid outer layer;
   using an apparatus that does not include a probe physically extending into the gas core for measuring the static gas pressure in the core to measure flow parameters in the conduit, wherein the measured flow parameters comprise a liquid layer tangential velocity, a liquid holdup and a static pressure of the flow at the wall of conduit; and
   determining the static gas pressure in the gas core from the measured flow parameters.

2. A method according to claim 1, wherein the conduit contains a constriction having a reduced conduit cross-section and the flow parameters are measured at the constriction.

3. A method according to claim 1, wherein at least one of the liquid layer tangential velocity and the liquid holdup are measured ultrasonically.

4. A method according to claim 1, wherein the gas/liquid flow comprises two liquid phases and the measured flow parameters include relative fractions of the two liquid phases.

5. A method according to claim 1, further comprising:
using the static gas pressure to process flow rates in the gas/liquid flow.

6. An apparatus for determining a static gas pressure in a gas/liquid flow, the apparatus including:
a conduit for conveying a swirling gas/liquid flow separated into a gas core and a liquid outer layer;
a device for measuring flow parameters in the conduit, wherein the measured flow parameters comprise a liquid layer tangential velocity, a liquid holdup and a static pressure of the flow at the wall of conduit; and
a processor configured to process the static gas pressure in the gas core from the measured flow parameters, wherein the apparatus does not include a probe physically extending into the gas core for measuring the static gas pressure in the gas core.

7. An apparatus according to claim 6, further comprising:
a swirl element for inducing the gas/liquid flow to swirl.

8. An apparatus according to claim 6, wherein the conduit comprises a constriction having a reduced cross-section relative to the conduit and the flow parameters are measured at the constriction.

9. An apparatus according to claim 6, wherein the device for measuring the flow parameters in the conduit comprises one or more ultrasound probes configured for ultrasonically measuring at least one of the liquid layer tangential velocity and the liquid holdup.

10. An apparatus according to claim 6, wherein the gas/liquid flow comprises two liquid phases and the measured flow parameters include relative fractions of the two liquid phases.

11. An apparatus according to claim 6, wherein the apparatus is non-invasive with respect to the gas/liquid flow.

12. A multiphase flow meter comprising:
the apparatus of claim 6; and
a computer system configured to determine the flow rate of at least one of the gas, the liquid and the total gas and liquid using the determined static gas pressure.

13. An oil well pipeline or a gas well pipeline including an apparatus according to claim 6.

\* \* \* \* \*